(12) United States Patent
Schluessler et al.

(10) Patent No.: US 9,335,804 B2
(45) Date of Patent: *May 10, 2016

(54) DISTRIBUTING POWER TO HETEROGENEOUS COMPUTE ELEMENTS OF A PROCESSOR

(71) Applicant: Intel Corporation, Santa Clara, CA (US)

(72) Inventors: Travis T. Schluessler, Hillsboro, OR (US); Ryan D. Wells, Folsom, CA (US); Yaakov Romano, Hana (IL)

(73) Assignee: Intel Corporation, Santa Clara, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 13/783,986

(22) Filed: Mar. 4, 2013

(65) Prior Publication Data

US 2014/0082380 A1   Mar. 20, 2014

Related U.S. Application Data

(63) Continuation of application No. 13/621,478, filed on Sep. 17, 2012.

(51) Int. Cl.
  *G06F 1/32* (2006.01)
  *G06F 1/26* (2006.01)

(52) U.S. Cl.
  CPC ...... *G06F 1/26* (2013.01); *G06F 1/324* (2013.01); *G06F 1/3296* (2013.01); *Y02B 60/1217* (2013.01); *Y02B 60/1285* (2013.01)

(58) Field of Classification Search
  CPC .................................................. G06F 1/3234
  See application file for complete search history.

(56) References Cited

U.S. PATENT DOCUMENTS

| 5,163,153 A | 11/1992 | Cole et al. |
| 5,522,087 A | 5/1996 | Hsiang |

(Continued)

FOREIGN PATENT DOCUMENTS

| WO | WO 2004-061686 A1 | 7/2004 |
| WO | WO 2011-028896 A1 | 3/2011 |
| WO | WO 2011-053303 A1 | 5/2011 |

OTHER PUBLICATIONS

International Searching Authority, "Notification of Transmittal of the International Search Report and the Written Opinion of the International Searching Authority," mailed Jan. 7, 2014, in International application No. PCT/US2013/048654.

(Continued)

*Primary Examiner* — Paul Yanchus, III
*Assistant Examiner* — Eric Chang
(74) *Attorney, Agent, or Firm* — Trop, Pruner & Hu, P.C.

(57) ABSTRACT

In one embodiment, the present invention includes a processor having a first domain with a first compute engine and a second domain with a second compute engine, where each of these domains can operate at an independent voltage and frequency. A first logic may be present to update a power bias value used to control dynamic allocation of power between the first and second domains based at least in part on a busyness of the second domain. In turn, a second logic may dynamically allocate at least a portion of a power budget for the processor between the domains based at least in part on this power bias value. Other embodiments are described and claimed.

16 Claims, 6 Drawing Sheets

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0083779 A1* | 4/2007 | Misaka ............... G06F 1/3203 713/300 |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0028246 A1* | 1/2008 | Witham ............... G06F 1/3203 713/330 |
| 2008/0250260 A1 | 10/2008 | Tomita |
| 2009/0006871 A1 | 1/2009 | Liu et al. |
| 2009/0100277 A1* | 4/2009 | Lai et al. ....................... 713/300 |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0054528 A1 | 3/2012 | Bose et al. |
| 2012/0223954 A1 | 9/2012 | Samson et al. |

OTHER PUBLICATIONS

U.S. Patent and Trademark Office, Office Action mailed on Mar. 23, 2015 and Reply filed on Jun. 19, 2015, in U.S. Appl. No. 13/621,478.
United States Patent and Trademark Office, Final Office Action mailed Oct. 8, 2015 and Reply filed Dec. 7, 2015 in U.S. Appl. No. 13/621,478.

* cited by examiner

DISTRIBUTING POWER TO HETEROGENEOUS COMPUTE ELEMENTS OF A PROCESSOR

This application is a continuation of U.S. patent application Ser. No. 13/621,478, filed Sep. 17, 2012, the content of which is hereby incorporated by reference.

BACKGROUND

As technology advances in the semiconductor field, devices such as processors incorporate ever-increasing amounts of circuitry. Over time, processor designs have evolved from a collection of independent integrated circuits (ICs), to a single integrated circuit, to multicore processors that include multiple processor cores within a single IC package. As time goes on, ever greater numbers of cores and related circuitry are being incorporated into processors and other semiconductors.

Multicore processors are being extended to include additional functionality by incorporation of other functional units within the processor. One issue that arises is that the different circuitry can consume differing amounts of power based on their workloads. However, suitable mechanisms to ensure that these different units have sufficient power do not presently exist.

For example, a processor including different compute elements limits the amount of total power consumed to a level called the thermal design power (TDP) limit. In addition to a configured TDP limit for a processor, an original equipment manufacturer (OEM) may limit the TDP of the processor even lower, to enable longer battery life, for different form factors, etc. When running power hungry workloads on these systems, the available power (up to the TDP limit) is split between different compute elements. The manner in which the power is split affects performance of the system. The current approach to this power distribution problem is to use a fixed ratio for all workloads and TDPs, meaning that a certain portion of the power is allocated to the different units of the processor. However, this approach is not optimal for all workloads.

DETAILED DESCRIPTION

Figure 1:
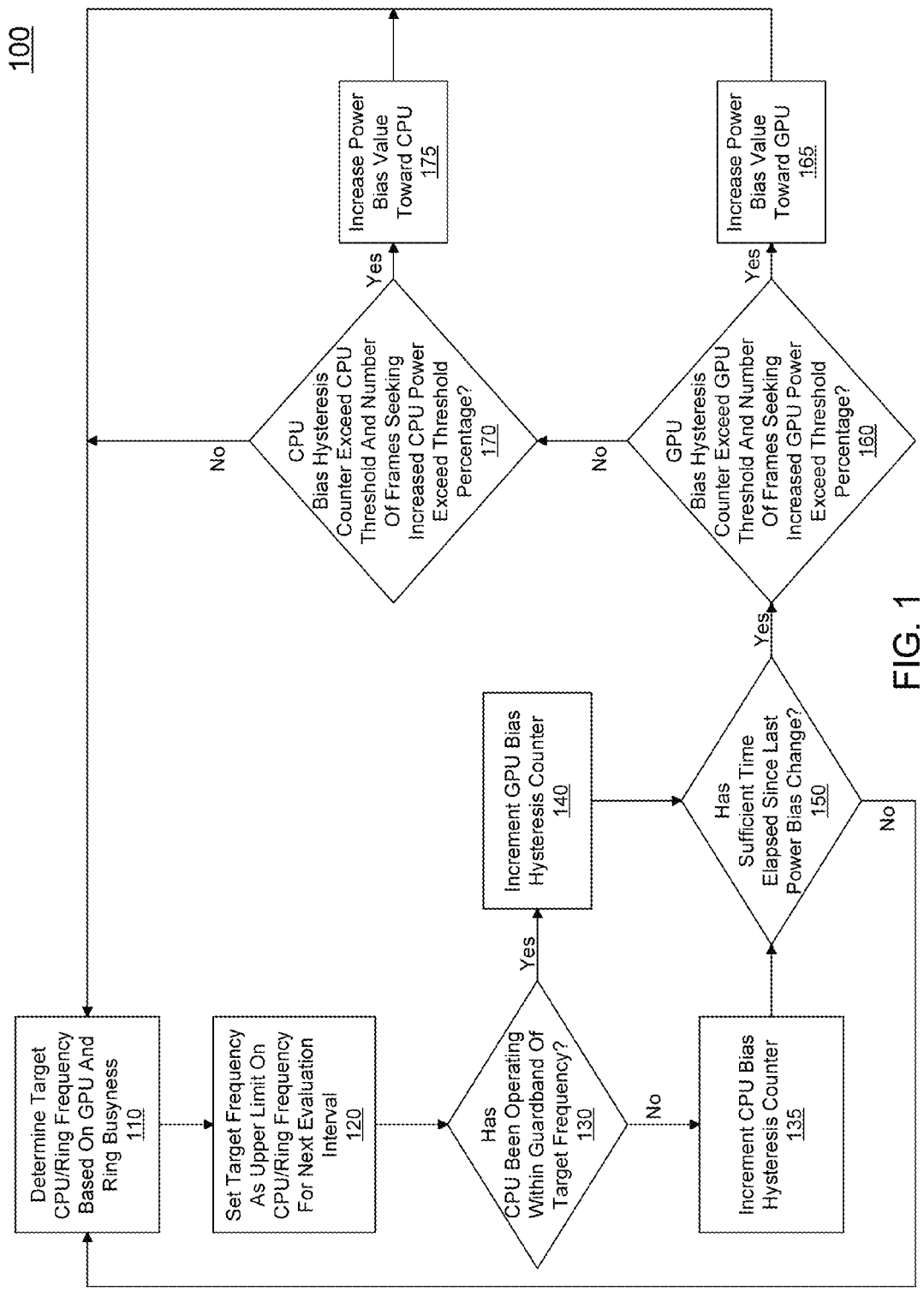
FIG. 1 is a flow diagram of a method for controlling a power bias between different domains of a processor in accordance with an embodiment of the present invention.

In various embodiments, a power bias technique may be provided and used in allocation of a power budget of a processor including multiple domains. In addition, a power bias value itself can be dynamically updated during run time. As used herein the term "domain" is used to mean a collection of hardware and/or logic that operates at the same voltage and frequency point. As an example, a multicore processor can further include other non-core processing engines such as fixed function units, graphics engines, and so forth. Other computing elements can include digital signal processors, processor communications interconnects (buses, rings, etc.), and network processors. A processor can include multiple independent domains, including a first domain associated with the cores (referred to herein as a core or central processing unit (CPU) domain) and a second domain associated with a graphics engine (referred to herein as a graphics or a graphics processing unit (GPU) domain). Although many implementations of a multi-domain processor can be formed on a single semiconductor die, other implementations can be realized by a multi-chip package in which different domains can be present on different semiconductor die of a single package. Further embodiments may be applicable for balancing power between computing elements of a single system made up of many individual chip packages. For example, a CPU on one package and a GPU on a different package with a total system power limit of 50 watts can be managed as described herein.

In a multi-domain processor, the multiple domains collectively share a single power budget. Accordingly, the higher the frequency at which, e.g., the core domain is operating, the higher the power consumed by the core domain. And in turn, the higher the power consumed by the core domain, there is less power left for the graphics domain to consume and vice versa.

For many applications executed on a processor, the core domain may act as a producer that generates workload data to be executed by the graphics domain, which thus acts as a consumer. For example, for many applications, such as a 3 dimensional (3D)-based application, the processor may act to access data from a memory, write commands and instructions into the memory, and provide data to the graphics domain for performing graphics operations such as various shading, rendering, and other operations to thus generate pixel data for display on an associated display.

In such applications, an intelligent bias control (IBC) in accordance with an embodiment of the present invention may dynamically adjust the distribution of power between the graphics domain and the core domain based on workload demand. Embodiments may be particularly appropriate for low power environments, such as where a processor is operating at a thermal limit such as a thermal design power (TDP) level (or an even lower level such as set by an OEM). In certain processors, a predetermined value of power sharing between multiple domains may be set, e.g., as part of a configuration of the system such as by a basic input/output system (BIOS). Although such setting may be appropriate for many workloads, for certain applications, particularly where the processor is configured to be limited to operation below the TDP limit, e.g., for purposes of power management or so forth, performance can be impacted. Instead using IBC in accordance with an embodiment of the present invention, a power bias value, which can be used to control allocation of power between different domains, can itself be dynamically controlled based on workload.

More specifically, embodiments may monitor operation of various domains, including core domain, graphics domain and an interconnect domain in order to determine if one or more of these domains needs more or less power than it is currently receiving. If the core and interconnect domains require less power than they are currently receiving in order to maintain the graphics domain fully busy, power distribution may be biased more toward the graphics domain, e.g., by adjustment to this power bias value. Instead if the core domain and/or interconnect domain need more power than they are currently receiving to maintain the graphics domain fully occupied, power distribution may be biased more towards the core domain and/or the interconnect domain, e.g., by opposite control of the power bias value.

In general, IBC in accordance with an embodiment of the present invention may generally operate as follows. First, an amount of work a given application is creating for the core, graphics, and interconnect domains can be measured. If it is determined based on these measurements that the graphics domain is idle, e.g., greater than a given threshold amount of time during an evaluation interval, power balance may be moved toward the core domain, e.g., by control of the power bias value. Instead if the graphics domain is being fully utilized during the evaluation interval, the power balance may be moved toward the graphics domain.

For ease of discussion, embodiments described herein are with regard to a multi-domain processor including a core domain and a graphics domain that can share a power budget. However understand the scope of the present invention is not limited in this regard and additional domains can be present. As another example, each core can be allocated to a different domain and each of the domains can be provided with a dynamically re-partitionable amount of a power budget. Furthermore, in addition to core domains and graphics domains, understand that additional domains can be present. For example, another domain can be formed of other processing units such as fixed function units, accelerators or so forth. And a still further domain can be provided for certain management agents of a processor, which can receive a fixed portion of a total power budget.

Note that embodiments to perform intelligent bias control as described herein may be independent of operating system (OS)-based power management. For example, according to an OS-based mechanism, namely the Advanced Configuration and Platform Interface (ACPI) standard (e.g., Rev. 3.0b, published Oct. 10, 2006), a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above this P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states). When all cores of a multicore processor are in a core low power state, the processor can be placed in a package low power state, such as a package C6 low power state.

Referring now to FIG. 1, shown is a flow diagram of a method for controlling a power bias between different domains of a processor in accordance with an embodiment of the present invention. As shown in FIG. 1, method 100 can be implemented in various hardware, software and/or firmware in different embodiments. For example, in an embodiment method 100 may be implemented in power sharing logic of a power controller of a processor such as a power control unit (PCU). In another embodiment, method 100 can be implemented in a device driver such as a kernel mode driver (KMD), e.g., for a graphics domain. Note that the embodiment described in FIG. 1 is with regard to analysis and control of power bias between a CPU domain and a graphics domain. Although described as sharing power between these particular domains in the embodiment of FIG. 1, understand the scope of the present invention is not limited in this regard and in other embodiments, dynamic power sharing may be between other types of domains having heterogeneous compute elements.

As seen in FIG. 1, portions of method 100 (generally through diamond 150) may be performed for each frame of graphics rendered during an evaluation interval. As seen, method 100 begins by determining a target frequency for a CPU domain and an interconnect domain (block 110). In the embodiment shown, this interconnect domain may have a ring-based interconnect, details of which will be discussed further below. In an embodiment, the determinations of these target frequencies may be based on certain metrics received from various locations of the processor. In general, these metrics may correspond to a busyness of the graphics domain and a busyness of the interconnect domain. That is, because typically the graphics domain is a consumer of data processed by the CPU domain (and which is thus the producer domain), using the graphics domain busyness (and the ring domain busyness) as a proxy may enable determination of an appropriate target frequency for the CPU domain (and the interconnect domain). In the illustrated embodiment, the busyness can be measured based on activity levels of various components or locations within a micro-architecture of the graphics domain and the interconnect domain. Or in another embodiment, the busyness can be determined based on a utilization rate of these components.

Still referring to FIG. 1, control next passes to block 120 where a target frequency can be set as an upper limit on the CPU domain frequency and interconnect domain frequency for a next evaluation interval. In an embodiment, this setting may be made by storing the target frequency in a maximum frequency storage, such as a configuration register, e.g., present in or associated with the PCU. A single target frequency may be set, or independent target frequencies for the CPU and interconnect domains may be set.

As will be described below, these domains may be controlled in the next evaluation interval (e.g., by the PCU) to operate at or lower than this target frequency. Note that on a determination to lower the target frequency (as when the CPU/interconnect are not being fully utilized) the amount of reduction may be by a first amount (e.g., 200 MHz), in an embodiment, to gradually decrease target frequency. Instead on a determination to raise the target frequency (as when the CPU/interconnect are fully utilized), the amount of increase may be by a second, higher amount (e.g., 500 MHz) in an embodiment, to more rapidly increase target frequency.

Control next passes to diamond 130 where it can be determined whether the CPU has been running within a guard band of this target frequency (e.g., during the current evaluation interval). Note that the guard band thus provides a measure of filtering of short frequency changes, e.g., due to brief spikes and dips in processor utilization, as well as performance and power state changes (respectively P-state and C-state changes). Thus as a result of such possible effects, a lower than requested CPU frequency over the time interval under analysis may occur. By using a guard band to guide power bias updates, increasing the power bias value too far towards the CPU domain based on such normal rhythms of CPU frequency can be prevented. In an embodiment, the guard band may be a predetermined percentage of the target frequency, e.g., 5-10%, although the scope of the present invention is not limited in this regard.

If it is determined that the CPU has been running within this guard band, control passes to block 140 where a counter associated with a graphics domain can be incremented. More specifically, a graphics bias hysteresis counter, which may be a counter located in a logic of the processor, may be incremented. Otherwise if the CPU frequency is lower than the target frequency by greater than the guard band, this is an indication that the CPU frequency is too low, and thus sufficient throughput from the CPU to the graphics domain is not being realized. Accordingly, control passes to block 135 where a CPU counter can be incremented, which may be another counter located in a logic of the processor. More specifically, a CPU bias hysteresis counter can be incremented. Note that by providing a measure of hysteresis by way of these counters, bias changes can be smoothed out. In this way, one time anomalous frame occurrences can avoid moving the bias too far in one direction, causing an overall performance slowdown.

Although not shown, in some embodiments a frame counter also may be incremented. This counter may thus provide a count of the number of frame rendered (and thus the number of loops through this portion of method 100). Then, from both of blocks 135 and 140, control passes to diamond 150 where it can be determined whether sufficient time has elapsed since the last power bias change. Although the scope of the present invention is not limited in this regard, in one embodiment this threshold time period or time window may be on the order on approximately 250 milliseconds (ms). Note that this time window-based analysis may be used to handle applications having different frame rates. When power sharing in accordance with an embodiment of the present invention is tuned to optimally run with low frame rate applications, it may result in frame rate oscillations in high frame rate applications due to the bias overshooting the optimum value. Instead by using a constant value time window, the rate of bias change may be normalized to be independent of frame rate of a given application under execution.

Referring still to FIG. 1, if sufficient time has elapsed since the last power bias change, control passes to diamond 160 where it can be determined whether the GPU bias hysteresis counter has exceeded a first threshold level. Although the scope of the present invention is not limited in this regard, in an embodiment, this first threshold level may be set at a given count value, which in some embodiments may be set at two. Also, it can be determined whether the number of frames for which a determination of greater GPU power is made (which in an embodiment can equal the GPU bias counter value) exceeds a first threshold percentage of frames. In an embodiment the percentage may be between approximately 55 and 65% of the number of frames analyzed. Thus if both the GPU bias counter exceeds the threshold level and greater than the predetermined percentage of analyzed frames indicates that greater graphics domain power is needed, control passes to block 165 where a power bias value can be increased towards the graphics domain. Although described with these multiple determinations, in other embodiments only a single one of these determinations may be performed (e.g., a comparison of a count to a threshold or a percentage of frames indicating a greater power consumption level is desired).

A variable amount of increase to this power bias value may be provided in certain embodiments. However, for ease of implementation, in other embodiments a fixed value of the increase may be implemented. In a particular embodiment, the increase may be in terms of percentage and may correspond to, e.g., between approximately 1-2%. Note that this power bias value may be a configuration register, e.g., present in the PCU that enables the PCU to dynamically allocate power budget between different domains. In some embodiments, as the graphics domain is the primary consumer of CPU domain activity, this bias value can be set to an initial level of between approximately 80-90% in favor of the graphics domain, meaning that of the power budget allocated between the graphics domain and the CPU domain, the given percentage corresponding to the power bias value may be allocated to the graphics domain.

If instead at diamond 160 it is determined that both the GPU bias hysteresis counter does not exceed the GPU (first) threshold and the number of frames seeking greater GPU power does not exceed the first threshold number of frames, control passes to diamond 170 where it can be determined whether the CPU bias hysteresis counter has exceeded a second threshold level (which in different embodiments may be the same or different value than the first threshold level) and whether the number of frames for which a determination of greater CPU power is made (which in an embodiment can equal the CPU bias counter value) exceeds a second threshold percentage of frames (which in different embodiments may be the same or different than the first threshold percentage of frames). If both these determinations are in the positive, control passes to block 175 where a power bias value can be increased towards the core domain. Otherwise, the method concludes for this set of frames without any adjustment to the power bias value. Although shown at this high level in the embodiment of FIG. 1, understand the scope of the present invention is not limited in this regard. For example, in other embodiments some of the techniques to provide a measure of hysteresis or reduced adjustment to the power bias value may not be present. Thus in other embodiments one or more of the hysteresis counters, the guard band analysis, the time window determination, and the percentage of frames analysis may be eliminated.

As an example of the determinations, assume 11 frames have elapsed, of which six indicated a need for more CPU power and five indicated less (and thus the CPU bias counter equals six and the GPU bias counter equals five). Also assume both bias counter thresholds are set at two and the percentage thresholds are set at 60%. In this scenario, no change to the bias value occurs, despite the fact that both hysteresis counters passed the two frame threshold. This is so to reduce the oscillation around an optimal bias point.

Figure 2:
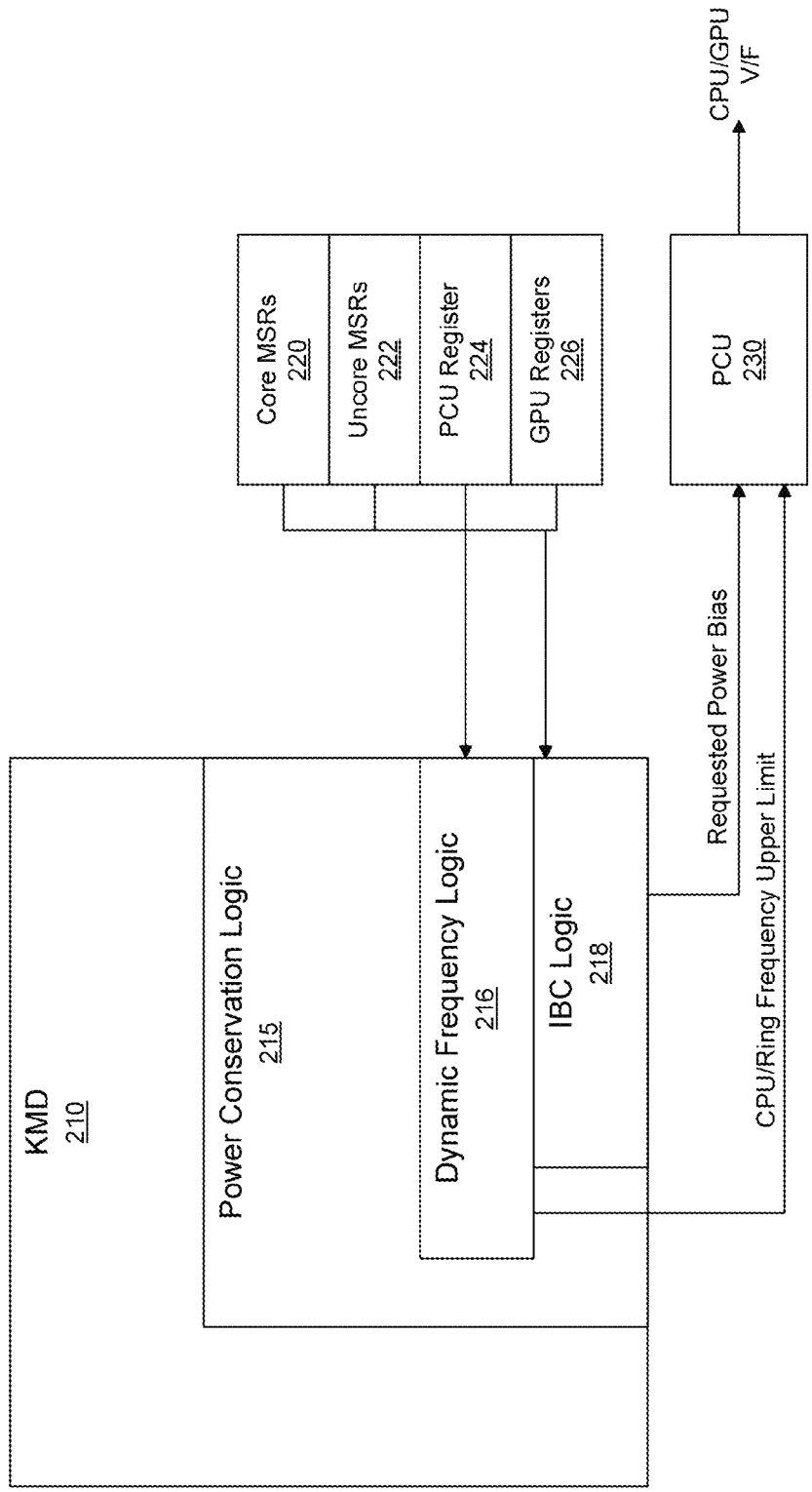
FIG. 2 is a block diagram of a portion of a processor in accordance with an embodiment of the present invention.

Referring now to FIG. 2, shown is a block diagram of a portion of a processor in accordance with an embodiment of the present invention. As shown in FIG. 2, processor 200 may include a kernel mode driver 210. More specifically, this driver may be configured as a device driver for a graphics domain to thus interface the graphics domain to an OS executing on the processor. As seen, driver 210 may include a power conservation logic 215 which may include various components to analyze different metrics of processor performance (more particularly with regard to the graphics domain) and to enable power conservation when possible.

In the embodiment shown, power conservation logic 215 may include a dynamic frequency logic 216 that may be used to determine optimal core and interconnect frequencies based on a workload being performed by the graphics domain. Thus as seen, logic 216 may output upper limit values for the frequency of both the core domain and the interconnect domain.

As seen in the embodiment of FIG. 2, these values may be provided to a PCU 230 which may include various hardware, software and/or firmware to perform power management operations, responsive to inputs from power conservation logic 215 as well as based on other inputs, such as various modes of operation as instructed, e.g., by the OS.

As further seen in FIG. 2, power conservation logic 215 may further include an intelligent bias control (IBC) logic 218 in accordance with an embodiment of the present invention. In general, logic 218 may operate according to the algorithm of FIG. 1 above to control a power bias value, which can be communicated to PCU 230. This power bias value thus indicates to the PCU how a shared power budget between core domain and the graphics domain is to be shared.

Referring still to FIG. 2, note that the operations performed within power conservation logic, including the frequency analysis performed by dynamic frequency logic 216 and the power bias analysis performed by IBC logic 218 may be performed responsive to various inputs. More specifically as seen in FIG. 2, power conservation logic 215 (and thus its constituent logics 216 and 218) may receive inputs from a number of locations within the processor. In the illustrated embodiment, these locations may include from core machine specific registers (MSRs) 220, uncore or system agent MSRs 222, PCU registers 224, which in an embodiment can be implemented using memory mapped IO (MMIO) registers, and graphics registers 226.

Various types of information may be received, including, for example various counter values from core MSR 220. In one embodiment, these counter values may include a timestamp counter (TSC) value, as well as other time-based counter values such as an actual count (ACNT) and a maximum count (MCNT). For example, a ratio of these values can indicate the average frequency over an evaluation interval. Various platform information such as memory utilization, L3 cache utilization/hit/miss counters, etc., may be received from system agent MSR 222 and used for estimating ring busyness. In turn, information received from PCU register 224 may include various fused values, such as maximum frequencies of operation and so forth. In addition, current frequencies at which various domains such as the CPU, graphics and interconnect domains are operating, may also be provided. Finally, GPU registers 226 may provide activity counts and other information indicative of busyness of the graphics domain. All of this data about actual platform behavior/busyness can then be used by the IBC logic to calculate optimum power bias values.

With regard to PCU 230, based on the upper limits identified for the CPU domain and interconnect domain, and the requested power bias (corresponding to a determined power bias value), an appropriate mix of power to be allocated to the core domain and the graphics domain can be determined. Based on this determination, PCU 230 may set an appropriate voltage and frequency combination for these independent domains. Thus as shown in FIG. 2, PCU 230 may output voltage and frequency values. In turn, these values may be used, e.g., by internal control logic of the domains, clock generators, voltage regulators, and so forth, to operate at the instructed levels. Although shown at this high level in the embodiment of FIG. 2, understand the scope of the present invention is not limited in this regard. That is while the example shown in FIG. 2 is with regard to IBC being performed within a kernel mode driver, understand that in other embodiments such control can be implemented within the PCU itself or as logic gates in other locations within a processor.

Figure 3:
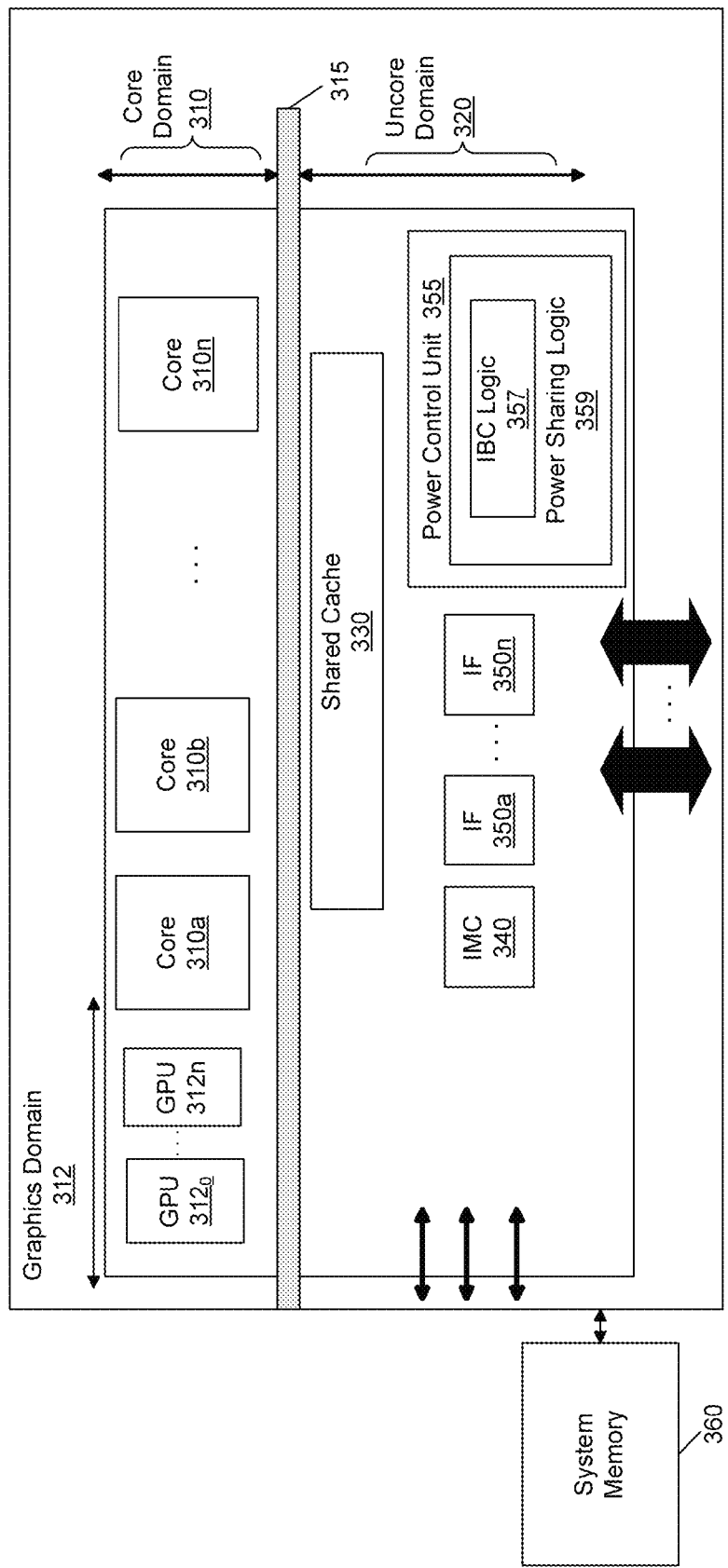
FIG. 3 is a block diagram of a processor in accordance with an embodiment of the present invention.

Referring now to FIG. 3, shown is a block diagram of a processor in accordance with an embodiment of the present invention. As shown in FIG. 3, processor 300 may be a multicore processor including a plurality of cores $310_a$-$310_n$ in a core domain 310. In one embodiment, each such core may be of an independent power domain and can be configured to operate at an independent voltage and/or frequency, and to enter turbo mode when available headroom exists, or the cores can be uniformly controlled as a single domain. As further shown in FIG. 3, one or more GPUs $312_0$-$312_n$ may be present in a graphics domain 312. Each of these independent graphics engines also may be configured to operate at independent voltage and/or frequency or may be controlled together as a single domain. These various compute elements may be coupled via an interconnect 315 to a system agent or uncore 320 that includes various components. As seen, the uncore 320 may include a shared cache 330 which may be a last level cache. In addition, the uncore may include an integrated memory controller 340, various interfaces 350 and a power control unit 355.

In various embodiments, power control unit 355 may include a power sharing logic 359, which may be a logic to perform dynamic control and re-allocation of an available power budget between multiple independent domains of the processor. In the embodiment of FIG. 3, power sharing logic 359 may include an IBC logic 357 to dynamically set a power bias value between core domain 310 and graphics domain 312, e.g., based on the busyness of these components as well as the busyness of interconnect 315. To this end, PCU 355 may include various registers or other storages, both to store a power bias value as well as to store an upper limit on core frequency and interconnect frequency as determined by the IBC logic or other such logic of the PCU. Although shown at this location in the embodiment of FIG. 3, understand that the scope of the present invention is not limited in this regard and the storage of this logic can be in other locations.

With further reference to FIG. 3, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 3, the scope of the present invention is not limited in this regard.

Figure 4:
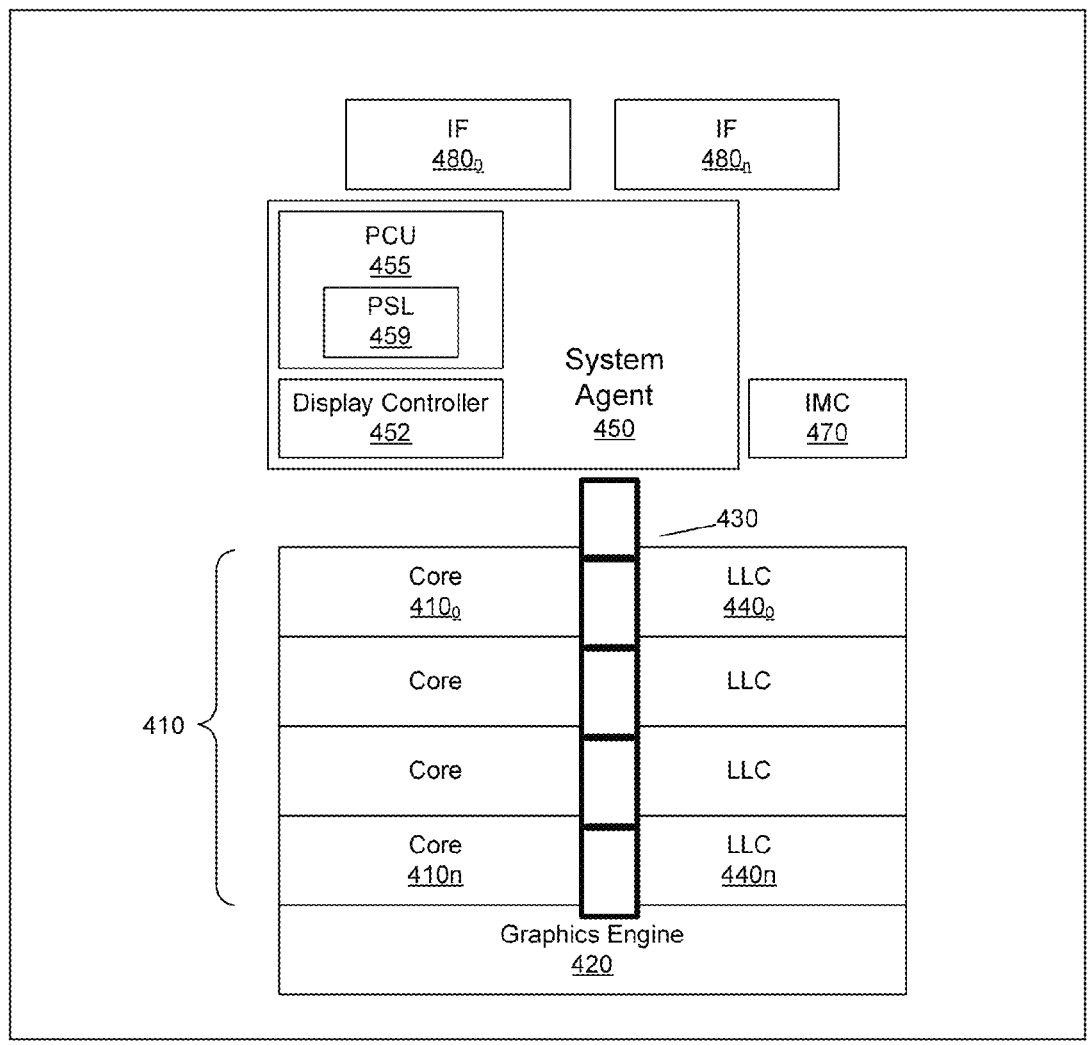
FIG. 4 is a block diagram of a multi-domain processor in accordance with another embodiment of the present invention.

Referring now to FIG. 4, shown is a block diagram of a multi-domain processor in accordance with another embodiment of the present invention. As shown in the embodiment of FIG. 4, processor 400 includes multiple domains. Specifically, a core domain 410 can include a plurality of cores $410_0$-$410_n$, a graphics domain 420 can include one or more graphics engines, and a system agent domain 450 may further be present. In various embodiments, system agent domain 450 may remain powered on at all times to handle power control events and power management such that domains 410 and 420 can be controlled to dynamically enter into and exit low power states. In addition, these domains can dynamically share a power budget between them based at least in part on a power bias value determined in accordance with an embodiment of the present invention. Each of domains 410 and 420 may operate at different voltage and/or power.

Note that while only shown with three domains, understand the scope of the present invention is not limited in this regard and additional domains can be present in other embodiments. For example, multiple core domains may be present each including at least one core. In this way, finer grained control of the amount of processor cores that can be executing at a given frequency can be realized.

In general, each core 410 may further include low level caches in addition to various execution units and additional processing elements. In turn, the various cores may be coupled to each other and to a shared cache memory formed of a plurality of units of a last level cache (LLC) $440_0$-$440_n$. In various embodiments, LLC 440 may be shared amongst the cores and the graphics engine, as well as various media processing circuitry. As seen, a ring interconnect 430 thus couples the cores together, and provides interconnection between the cores, graphics domain 420 and system agent circuitry 450.

In the embodiment of FIG. 4, system agent domain 450 may include display controller 452 which may provide control of and an interface to an associated display. As further seen, system agent domain 450 may include a power control unit 455 which can include a power sharing logic 459 in accordance with an embodiment of the present invention. In various embodiments, this logic may execute an algorithm such as shown in FIG. 1 to thus dynamically share an available package power budget between the core domain and the graphics domain.

As further seen in FIG. 4, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 4, understand the scope of the present invention is not limited in this regard.

Figure 5:
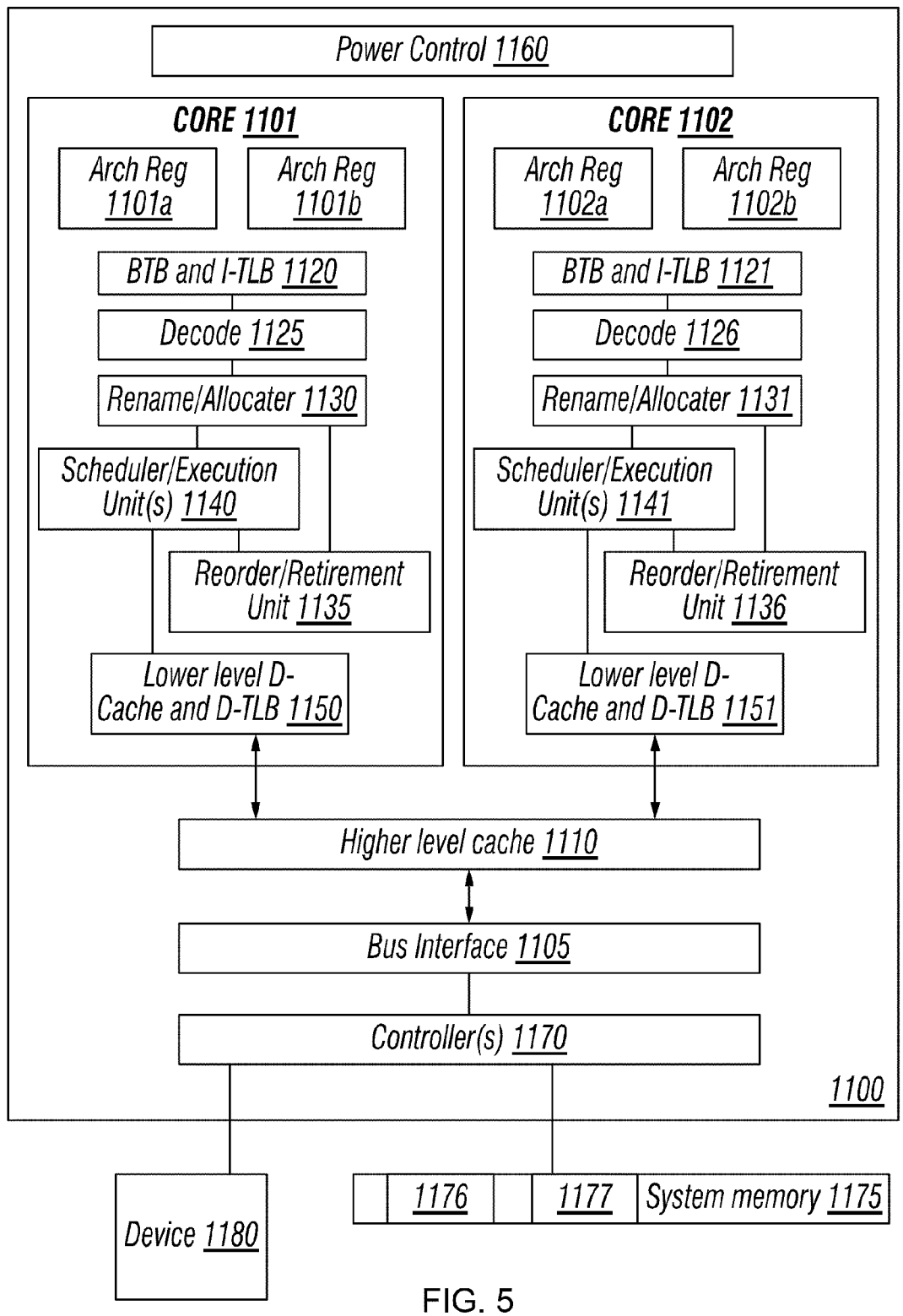
FIG. 5 is a block diagram of an embodiment of a processor including multiple cores.

Referring to FIG. 5, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 5, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 5, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed.

Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 6:
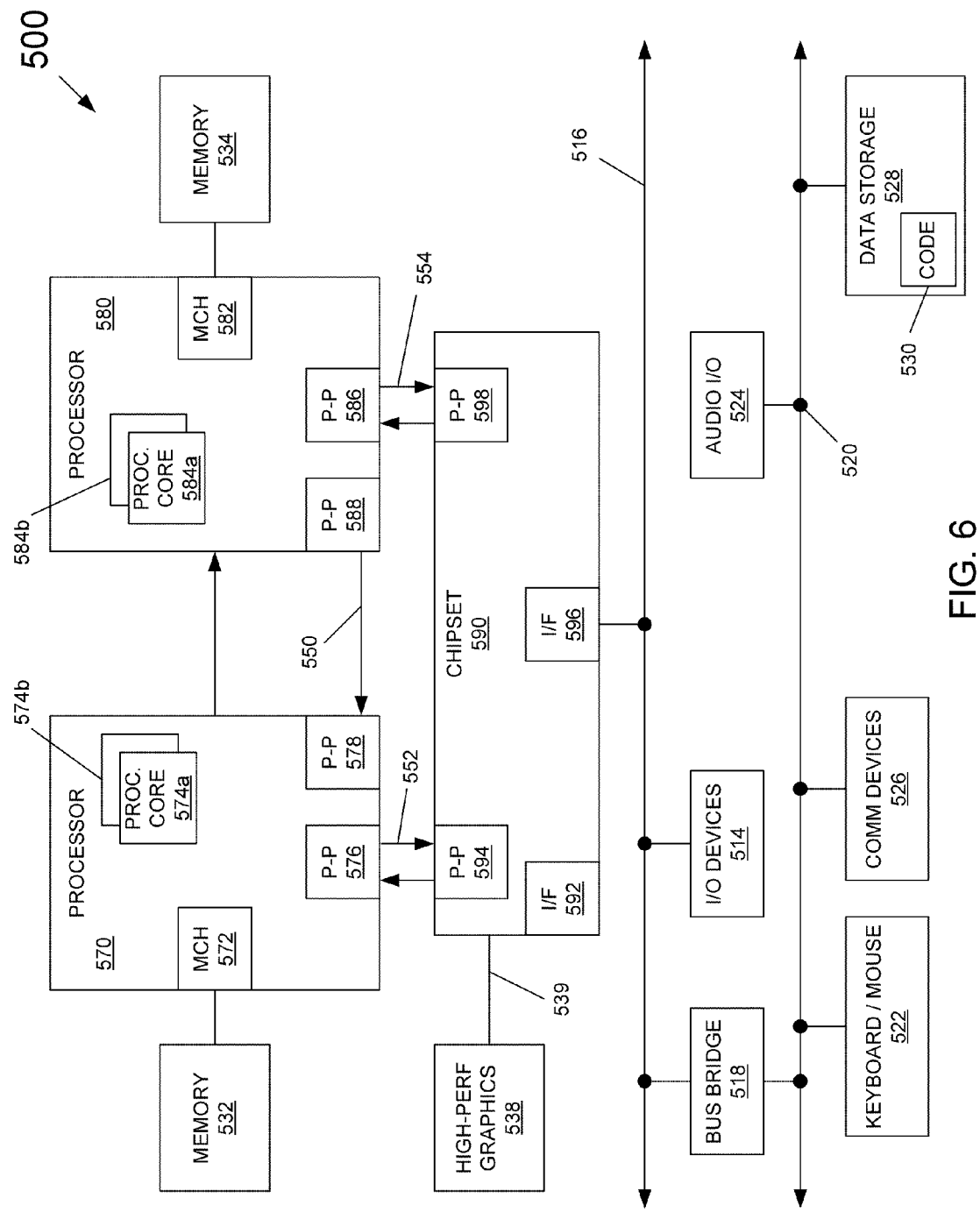
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), although potentially many more cores may be present in the processors. Each of the processors can include a PCU or other logic to perform dynamic allocation of a package power budget between multiple domains of the processor based, at least in part, on a power bias value, as described herein.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first domain having a first compute engine;
a second domain having a second compute engine, the first and second compute engines asymmetrical, each of the first and second domains to operate at an independent voltage and frequency;
a first domain counter and a second domain counter, wherein one of the first and second domain counters is to be updated based on whether a frequency of the first domain is substantially around a target frequency for the first domain;
a power bias logic to dynamically update a power bias value stored in a configuration register, the power bias value used to control dynamic allocation of power between the first and second domains based at least in part on a measure of a busyness of the second domain, the power bias value corresponding to a portion of a power budget for the processor to be allocated to one of the first and second domains, wherein the power bias logic is to dynamically update the power bias value based at least in part on one of the first domain counter and the second domain counter; and
a power controller to dynamically allocate at least a portion of the power budget between the first and second domains based at least in part on the power bias value.

2. The processor of claim 1, wherein the second domain is a consumer domain and the first domain is a producer domain, the first compute engine is a core, the core including a decode unit to decode instructions, at least one execution unit to execute decoded instructions, and a retirement unit to retire executed instructions; and
the second compute engine is a graphics engine.

3. The processor of claim 1, wherein the power bias logic is to determine the target frequency based on the measure of the busyness of the second domain.

4. The processor of claim 3, wherein the power bias logic is to determine the target frequency further based on a measure of a busyness of an interconnect domain that couples the first and second domains.

5. The processor of claim 1, wherein the power bias logic is to update the second domain counter when the frequency of the first domain is within a threshold of the target frequency and to update the first domain counter when the first domain frequency is not within the threshold of the target frequency.

6. The processor of claim 5, wherein the power bias logic is to compare the second domain counter to a second threshold, if a threshold time period has occurred since a last update to the power bias value.

7. The processor of claim 6, wherein the power bias logic is to adjust the power bias value in favor of the second domain when the second domain counter is greater than the second threshold.

8. An apparatus comprising:
a multicore processor having a first domain including a plurality of cores, a second domain including at least one graphics engine, and a third domain including system agent circuitry, the third domain to operate at a fixed power budget and including a power controller to control delivery of power to the first and second domains, and a power bias logic to dynamically determine a power bias value to indicate a bias of the power delivery as between the first and second domains responsive to a measure of a busyness of the second domain, a measure of a busyness of an interconnect domain that couples the first and second domains and a value of at least one of a first counter and a second counter and to communicate the power bias value to the power controller for storage in a configuration register, wherein the power bias logic is to update the second counter when a frequency of the first domain is within a threshold of the target frequency for the first domain and update the first counter when the first domain frequency is not within the threshold of the target frequency for the first domain.

9. The apparatus of claim 8, wherein the power bias logic is to set the target frequency for the first domain based on the interconnect domain busyness and the second domain busyness.

10. The apparatus of claim 9, wherein the power bias logic is to communicate the target frequency to the power controller, the power controller to store the target frequency in a maximum frequency register and to limit a frequency of the first domain to the target frequency.

11. The apparatus of claim 8, wherein the power bias logic is to adjust the power bias value in favor of the second domain when the second counter is greater than a second threshold, and to adjust the power bias value in favor of the first domain when the first counter is greater than a first threshold.

12. The apparatus of claim 11, wherein the power bias logic is to compare one of the first and second counters to the corresponding one of the first and second thresholds, if a threshold time period has occurred since a last update to the power bias value.

13. The apparatus of claim 8, wherein the power controller is to control the power delivery to the first and second domains based at least in part on the power bias value.

14. A non-transitory machine-readable medium having stored thereon instructions, which if performed by a machine cause the machine to perform a method comprising:
determining, in a first logic of a processor, a target frequency for a core domain of the processor based on an activity level of a graphics domain of the processor and an activity level of an interconnect domain of the processor;

determining whether the core domain has been operating within a threshold level of the target frequency during an evaluation interval;

updating one of a first counter and a second counter based on the determination; and dynamically adjusting a power bias value based on at least one of the first and second counters, wherein the power bias value indicates a portion of a power budget to be allocated to one of the core domain and the graphics domain.

15. The non-transitory machine-readable medium of claim 14, wherein the method further comprises providing the target frequency to a power controller of the processor, wherein the power controller is to limit a frequency of the core domain to the target frequency.

16. The non-transitory machine-readable medium of claim 14, wherein the method further comprises performing the target frequency determining and the updating of at least one of the first and second counters for each graphics frame rendered by the graphics domain during a first time period, and adjusting the power bias value after the first time period.

* * * * *